US005433492A

United States Patent [19]

Glossop, Jr.

[11] Patent Number: 5,433,492

[45] Date of Patent: Jul. 18, 1995

[54] FERROUS CHIP REMOVAL TOOL

[75] Inventor: Frank R. Glossop, Jr., Tulsa, Okla.

[73] Assignee: TDW Delaware, Inc., Wilmington, Del.

[21] Appl. No.: 204,060

[22] Filed: Jun. 3, 1994

[51] Int. Cl.[6] .......... B25J 15/06; B66C 1/04

[52] U.S. Cl. .......... 294/65.5

[58] Field of Search .......... 294/65.5; 335/285, 291-294, 335/301-303; 901/40

[56] References Cited

U.S. PATENT DOCUMENTS

| | | | |
|---|---|---|---|
| 2,417,762 | 3/1947 | Koller | 294/65.5 |
| 2,471,764 | 5/1949 | Miller et al. | 294/65.5 |
| 2,599,966 | 6/1952 | Zachary | 294/65.5 |
| 2,693,979 | 11/1954 | Russell | 294/65.5 |
| 2,976,075 | 3/1961 | Budreck | 294/65.5 |
| 3,011,819 | 12/1961 | Moseley, Jr. | 294/65.5 |
| 3,169,791 | 2/1965 | Twachtman | 294/65.5 |
| 4,178,029 | 12/1979 | Lapan | 294/65.5 |
| 4,431,017 | 2/1984 | Willemsen | 137/15 |
| 4,575,143 | 3/1986 | Nast | 294/65.5 |
| 4,620,739 | 11/1986 | Coralline | 294/65.5 |
| 4,813,729 | 3/1989 | Speckhart | 294/65.5 |
| 4,943,098 | 7/1990 | Aoyama | 294/65.5 |
| 5,169,193 | 12/1992 | Stelmach | 294/65.5 |

FOREIGN PATENT DOCUMENTS

| | | | |
|---|---|---|---|
| 505142 | 8/1951 | Belgium | 294/65.5 |

*Primary Examiner*—Johnny D. Cherry

*Attorney, Agent, or Firm*—Head & Johnson

[57] ABSTRACT

A tool is provided for removing ferrous chips, such as those that fall into the interior of a steel pipe when an opening is drilled into the pipe. The tool has a stem arranged so that a rod can be attached to the upper end to manipulate the tool. A magnet is affixed to the lower end of the stem. An inner non-magnetic tubular casing is telescopically received on the stem, the inner casing having a closed end that normally fits against the magnet. An outer tubular non-magnetic casing is telescopically received on the inner casing. A coil spring urges the outer casing downwardly so that the inner casing having the magnet therein is normally received within the lower end of the outer casing, the outer casing being displacable when forced against an object to move the inner casing and magnet therein to attract ferrous chips. After pressure against the outer casing is removed, it telescopically extends over the inner casing and attracted ferrous chips to retain them against dislodgement. The ferrous chips are removed from the lower end of the inner casing by moving it against a coil spring to displace the inner casing lower end away from the magnet.

8 Claims, 2 Drawing Sheets

Fig. 1
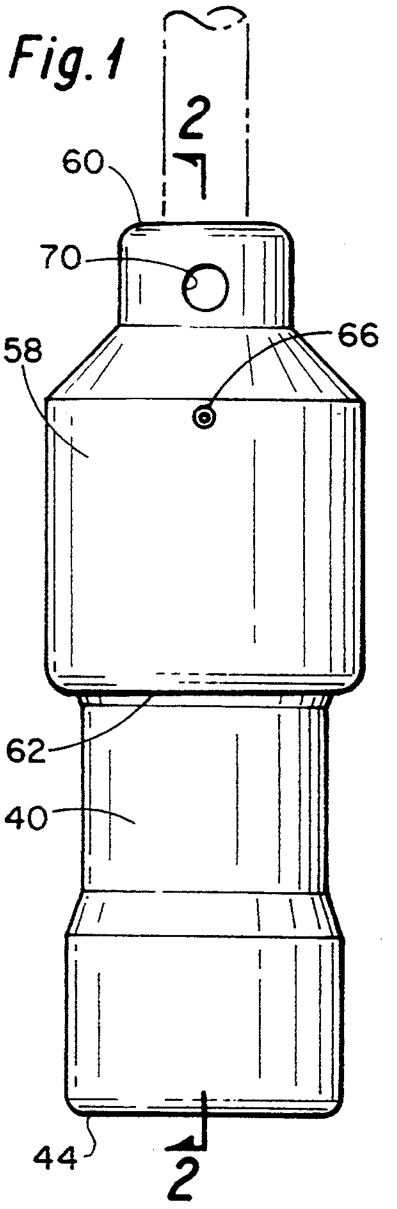
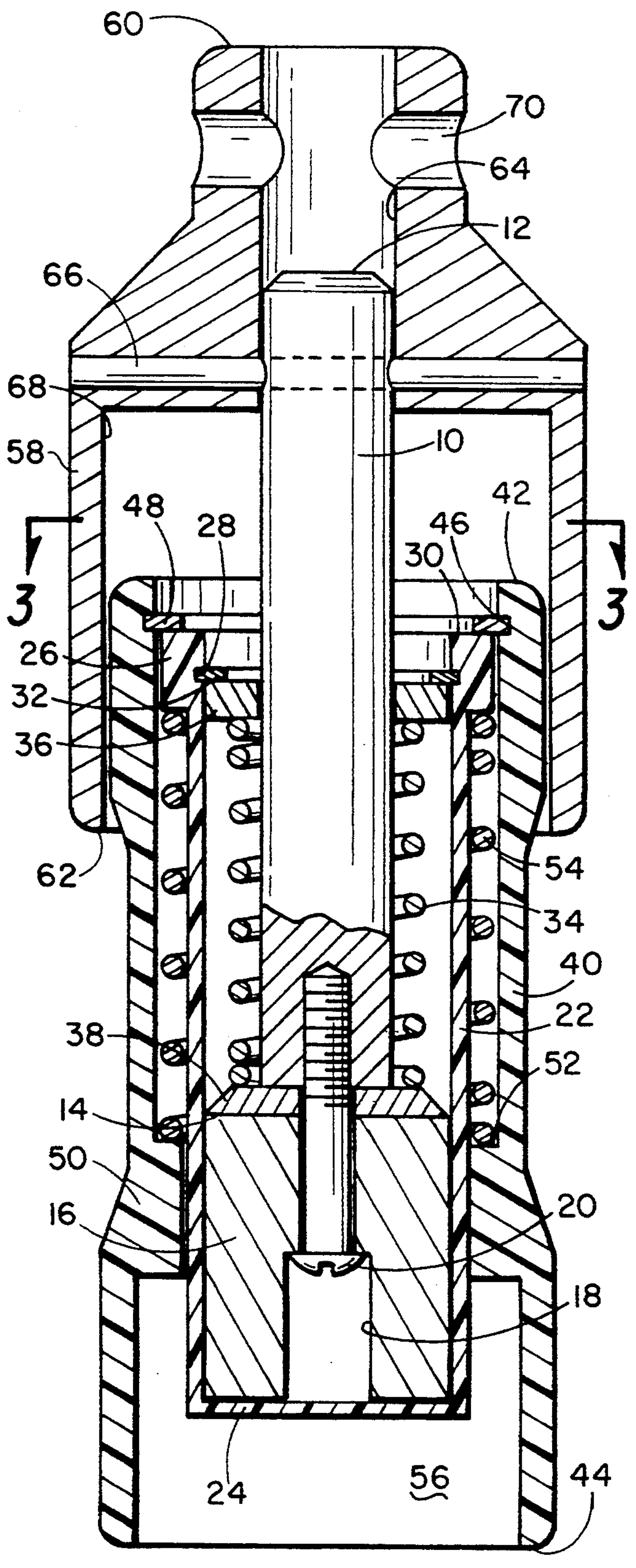
Fig. 2
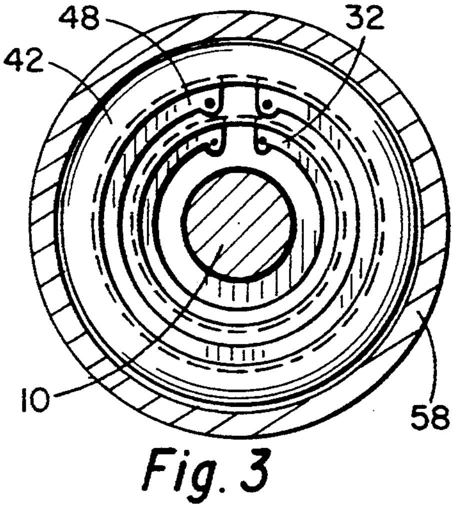
Fig. 3

FERROUS CHIP REMOVAL TOOL

CROSS-REFERENCE TO PENDING APPLICATIONS

This application is not related to any pending applications.

CROSS-REFERENCE TO MICROFICHE APPENDIX

This application is not related to any microfiche.

BRIEF SUMMARY OF THE INVENTION

This invention is for an improved device for removing ferrous chips, that is, chips that are attractable by a magnet.

Most pipelines used for transporting liquids or gases under high pressure are made of steel. Occasionally, it is necessary to tap an existing pipeline for attaching a branch fitting, for inserting a fluid blockage device or for other purposes. Equipment has been developed that will permit the attachment of a branch fitting while the pipeline is under pressure—that is, without taking the pipeline out of use. For this type application, the usual procedure is to bolt or weld a flange onto the exterior of the pipeline. A valve is attached to the flange and a fitting is then attached to the valve so that devices can be assembled for insertion through the valve into the interior of the pipeline. A hole cutting saw can be employed in this manner to cut an opening in a pipeline while the pipeline is still in use and under pressure. For further information as to an apparatus of this type see U.S. Pat. No. 3,614,252 entitled "Tapping Apparatus" issued Oct. 19, 1971.

A problem encountered in the use of a tapping apparatus, such as illustrated in this previously issued United States patent, is that of removing the metal chips that are cut out of the pipeline during the tapping process. These chips typically fall into the bottom of the pipeline. That is, when a ferrous metal pipe is "tapped" to provide an access opening for a pipeline plugging device, for a branch fitting, or the like, cutting debris is produced by the hole saw or shell cutter used to cut the opening. This debris, usually called "chips", falls to the bottom inside diameter of the pipeline, directly below the cut opening. When the product flow through the pipeline is not sufficiently high, these chips will remain substantially in place and can interfere with sealing apparatus intended to plug the interior of the pipeline since to plug the pipeline and shut off the product flow through it, the plugging device requires intimate contact with the pipe interior surface which is prevented by the presence of chips.

Currently, the most common means used to remove chips from a pipeline is a tool formed of a magnet attached to the end of a metal rod that passes through a sealing gland in a housing that is attached to a tapping valve, as above described. The practice is to use the rod to move the magnet to the pipe interior surface to collect the ferrous chips. After the magnet has been moved in various positions to attract as many chips as possible, the magnet having the chips clinging thereto is pulled into the housing and the valve is closed so that the housing can be safely disconnected from the valve, The chips can then be removed from the magnet. It is common to repeat the chip removal procedure several times to collect as many chips as can be reached.

This currently used procedure has several problems. Obviously, the magnet will tend to attach to the pipe and to fittings, valves or housings that are employed in the procedure. Withdrawing the collected chips is difficult. Chips can be disengaged from the magnet if it is allowed to contact any ferrous enclosure surface. This becomes a particularly serious problem if the chips are deposited in the internal threads of fittings. Therefore, under current procedures the magnet must be relatively small with limited magnetic force so that it can be manipulated without contacting surrounding surfaces. Since relatively small magnets must be employed, the amount of chips that can be removed is limited.

The chip removal tool of this invention eliminates the aforementioned problems. The new chip removal tool provides a magnet surrounded by two concentric telescopically positioned non-magnetic casings, that is, an inner casing and an outer casing. The lower end of the inner casing normally fits in contact with the magnet and is held in such position by a spring. The lower end of the outer casing extends downwardly beyond the inner casing, providing a space or cavity into which chips may be gathered. When downward force is applied against the magnet, the inner casing is displaced downwardly with respect to the outer casing so that the end thereof is flush with the outer casing to permit contact with and pick up chips. After pressure is removed, the inner casing, having the chips attached thereto, is withdrawn into the outer casing. This arrangement causes the outer casing to shield and protect the chips secured to the inner casing as the tool is removed.

As the tool is removed the outer casing protects the collected chips from contact with surrounding surfaces so that the chips are not dislodged. After the tool is removed from gathering chips/the inner casing can be telescopically moved relative to the magnet to thereby cause the chips to release from the exterior of the inner casing and be removed.

Others have provided chip removing devices employing magnets and for background material to this type of endeavor, reference may be had to the following previously issued U.S. Pat. Nos. 2,599,966; 3,011,819; 3,169,791; 4,178,029; 4,575,143; 4,813,729 and 5,169,193.

A better understanding of the invention can be obtained from the following description and claims, taken in conjunction with the attached drawings.

BRIEF DESCRIPTION OF THE DRAWINGS

FIG. 1 is an elevational view of a preferred embodiment of the ferrous chip removal tool of this invention.

FIG. 2 is a cross-sectional view of the ferrous chip removal tool as taken along the line 2—2 of FIG. 1.

FIG. 3 is an end view of the tool of FIGS. 1 and 2.

DESCRIPTION OF THE PREFERRED EMBODIMENT

Figure 5:
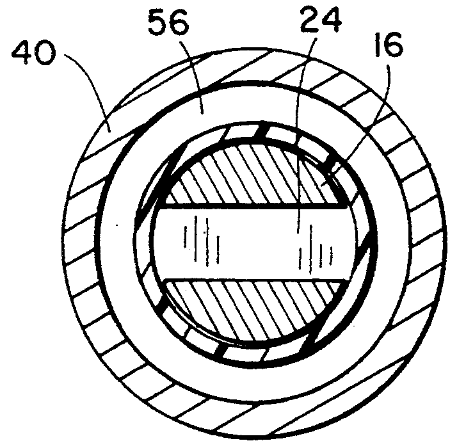
FIG. 5 is a cross-sectional view taken along the line 5—5 of FIG. 4 showing the magnetic construction.

FIGS. 1, 2, 3 and 5 show a preferred embodiment of the invention. The ferrous chip removal tool is a device for attachment to the end of a rod that permits the device to be inserted into an area where ferrous metal chips have gathered to permit the device to attract the chips by magnetic action so that the chips are removed as the device is removed. A typical application of the chip removal tool of this disclosure, but certainly not the only application, is that of removing chips from the interior of a pipeline when an opening has been cut in the sidewall of the pipeline. Usually, openings are cut in the pipeline sidewall by the use of a circular tool. By use of tapping tools available from T. D. Williamson Company, Inc., Tulsa, Okla., pipelines, while under pressure, that is, while carrying liquid or gases, can be tapped so as to provide a branch fitting to or from the pipeline, for insertion of a plugging device, or for other purposes. As a hole is cut in a pipeline sidewall, it inevitably leaves some chips. If the fluid velocity, whether liquid or gas, is such in a pipeline as to carry away these chips so that they are ultimately removed with the liquid or gas, then no clean up is necessary. In many instances, however, the fluid flow is not sufficient to carry the chips away and they can remain more or less in the place deposited when the sidewall opening is cut. These chips can interfere with plugging tools and, therefore, in many instances the chips need to be removed.

The major components of the tool are supported about a stem 10 that has an upper end 12 and a lower end 14. Attached to the stem lower end 14 is a magnet 16 which, in the illustrated arrangement, is cylindrical and has an opening 18 therethrough which receives a screw 20 by which the magnet is held to lower end 14 of stem 10.

Telescopically received on stem 10 and magnet 16 is an inner casing 22. Casing 22 is closed at the lower end 24 and has an enlarged external diameter portion 26 at the upper end thereof.

A circumferential recess 28 is formed in the internal cylindrical surface of inner casing 22 adjacent upper end 30 thereof, the circumferential recess receiving a retainer ring 32.

A coiled spring 34 is positioned between an upper washer 36 and a lower washer 38 that are received on stem 10. Upper washer 36 engages retaining ring 32. Lower washer 38 is positioned between the lower end of stem 10 and magnet 16. Lower washer 38 can be made to be integral with stem 10 in which case magnet 16 can be attached to the stem with adhesive bonding material, thus eliminating the use of screw 20. The inner casing 22 is preferably formed of non-paramagnetic material, that is, such as aluminum, brass or the like, so that ferrous metal particles or cuttings are attracted to the lower end 24 of the inner casing. Spring 34 also permits the inner casing to be telescopically moved with respect to stem 10 and magnet 16 for purposes of dislodging collected chips in a manner to be described subsequently.

Telescopically received on inner casing 22 is an outer casing 40 having an upper end 42 and a lower end 44. Outer casing has an internal circumferential groove 46 adjacent top 42 that receives a retainer ring 48 that normally bears against top 30 of inner casing 22.

Formed internally of outer casing 40 is a reduced internal diameter portion 50 providing an internal ledge 52. Compressibly extending between the internal ledge part of the outer casing and the enlarged diameter portion 26 of inner casing 22 is a coil spring 54. The function of spring 54 is to maintain outer casing 40 downwardly biased with respect to the inner casing. The lower end 44 of the outer casing extends beyond inner casing lower end 24. Further, the internal diameter of the outer casing adjacent lower end 44 is enlarged, as illustrated. This arrangement provides an enclosed chip retaining area 56, the function of which will be described subsequently.

Affixed to stem 10 and adjacent upper end 12 is a cap member 58 having an upper end 60 and lower end 62. The upper end of the cap member has a bore passage way 64 that receives stem 10. Cap member 58 is secured to the stem by means of a self locking spring pin 66.

The internal diameter of the cap member at the lower end 62 is enlarged to provide a recess 68 that telescopically receives upper end portion 42 of outer casing 40.

Bore passageway 64 in the upper end of end cap 58 is adapted to receive the lower end of a rod (not shown) or other similar member by which the tool can be manipulated. A passageway 70 is provided in the reduced diameter upper end portion of cap member 58 to receive a bolt, cotter pin or the like by which the lower end of a rod may be received by the cap member.

OPERATION

Figure 4:
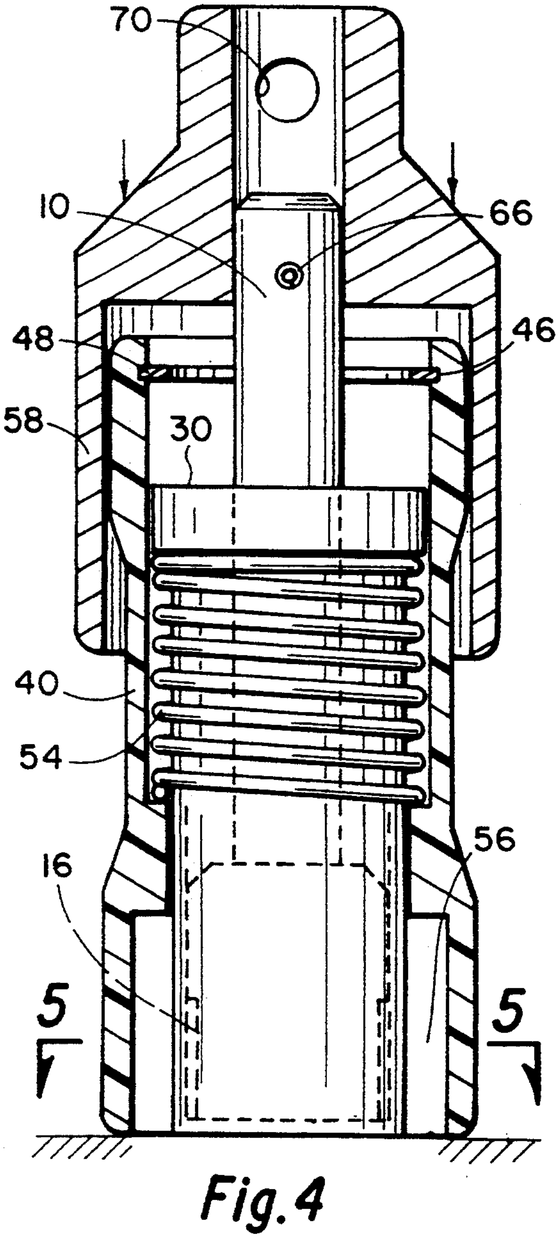
FIG. 4 is a cross-sectional view of the tool as shown in FIG. 2, slightly reduced, and showing the tool as pressed against a surface having chips.

When the ferrous chip removal tool as illustrated in FIGS. 1, 2 and 3 is to be used to recover ferrous chips, such as in the interior of a pipeline through which a hole has been drilled in the sidewall, the tool is inserted, by use of a rod (not shown) through the hole cut in the pipeline to the bottom of the pipeline where chips will have, by gravity, accumulated. As shown in FIG. 4, when lower end 44 of outer casing 40 engages an object on which chips are deposited, such as the interior bottom of a pipeline, further downward pressure on stem 10 compresses spring 54 causing stem 10, and along with it, magnet 16 and inner casing 22 to extend downward relative to outer casing 40 so that the inner casing lower end 24 is in proximity with the outer casing lower end 44 to engage the chips. Since magnet 16 is in immediate contact with the interior of the inner casing lower end 24, the chips are attracted to the lower end of the inner casing.

The tool can be moved around and repeatedly forced against the physical object on which the chips are deposited, and in each new location the tool is pushed downward to engage the inner casing lower end with the chips. When pushing pressure is removed, the inner casing is returned to the position illustrated in FIG. 2 by the force of spring 54 to carry with it any entrapped chips. These chips are held against the outer surface of the lower portion of inner casing 22 within space 56 and are shielded from dislodgement by outer casing 40. The tool can be withdrawn from the interior of the pipe or other objects in which chips are collected. The protection provided by the outer casing ensures that the chips will not be inadvertently dislodged as the tool is removed.

Figure 6:
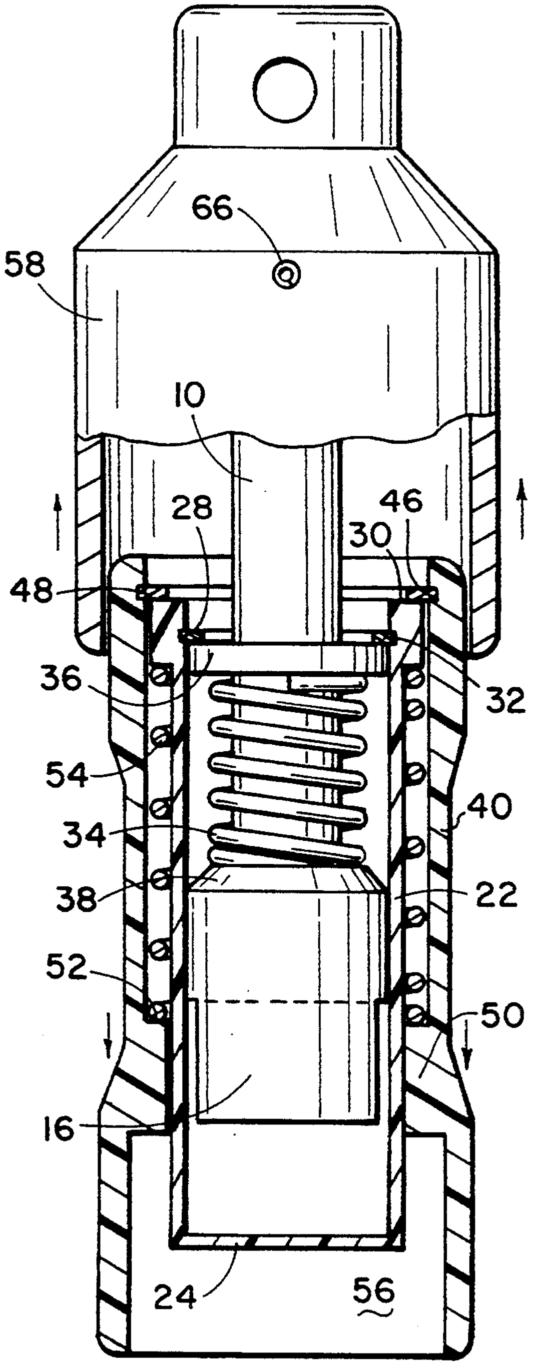
FIG. 6 is an elevational view of the tool shown mostly in cross-section as the tool is actuated to remove chips from contact with the inner casing.

Chips held in contact with the lower end portion of interior casing 22 can be released from the casing by pushing the outer housing 40 forward with respect to cap member 58 as shown in FIG. 6. This compresses spring 34 causing inner casing 22 to be moved forwardly with respect to magnet 16. After a sufficient space is formed between magnet 16 and lower end 24 of inner casing 22, the magnetic attraction holding the chips to the surface of the inner casing is diminished to the point that the chips are released to fall out of cavity 56. When this forward pressure applied against outer casing 40 is released, spring 34 returns the inner casing to the position illustrated in FIG. 2 wherein magnet 16 is juxtaposed against inner casing lower end 24 so that the tool is again ready to gather more chips.

The current art most frequently used to remove chips from a pipeline utilizes a tool normally comprised of a magnet attached to the end of a metal rod that passes through a sealing gland in a housing. The housing is attached to a tapping valve which is attached to a tapping fitting and the tapping fitting is attached to the pipeline to contain any pressure that may exist. The current practice is to use the rod to move the magnet to the interior pipe surface, collect the chips, pull the magnet and chips into the housing and close the tapping valve. Thereafter, the housing can be safely disconnected from the tapping valves. The chips can then be removed from the magnet. It is common to repeat the chip removal procedure several times to collect as many chips as can be reached.

This current practice has four problems. First, the magnet can attach to the pipe, fitting, valve or housing as it is manipulated to withdraw the collected chips, making withdrawal difficult. Second, chips can be disengaged from the magnet if it is allowed to contact any of the enclosure surfaces, which is a serious problem if the chips are deposited in the internal threads of fittings. Third, the magnet must be relatively small, with limited magnetic force to aid in manipulation without contacting the surrounding surfaces and, therefore, is limited in the amount of chips that can be removed. Fourth, the removal of chips from the magnet is difficult as they have to be manually scraped off against the force of the magnet.

The ferrous chip removal tool of FIGS. 1 through 5 overcomes all of these problems by providing non-magnetic inner casing 22 and outer casing 40 around magnet 16 together with the use of springs 34 and 54.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A ferrous chip removal tool, comprising:

a stem having a lower end;

a magnet affixed to said stem lower end;

an outer, non-magnetic tubular casing telescopically received on said stem, the outer casing having an upper end and a lower end;

a tubular, non-magnetic inner casing having a closed lower end, said magnet being received within the inner casing; and a first spring member positioned to resiliently bias said outer casing to a first position in which said outer casing lower end extends beyond said inner casing to fully encompass said magnet within said outer casing and, when downward force is applied to said stem to urge said outer casing lower end against an object, to permit said outer casing to upwardly displace relative to said inner casing to expose said inner casing closed lower end having said magnet therein whereby said magnet is in position to attract ferrous chips.

2. A ferrous chip removal tool according to claim 1 in which said spring member is a coiled spring received around said inner casing, the coiled spring having a first end secured with respect to said inner casing and a second end secured with respect to said outer casing.

3. A ferrous chip removal tool according to claim 1 wherein said inner casing is telescopically displacably received on a lower portion of said stem and including:

a second spring received on said stem within said inner casing, the second spring having an upper end in engagement with said inner casing and a lower end in engagement with said stem whereby said inner casing closed lower end may be resiliently displaced away from said magnet to cause ferrous chips to be released from said inner casing lower end.

4. A ferrous chip removal tool according to claim 1 including:

a cap member having an upper and a lower end, the upper end having means for attachment to said stem, the lower end being tubular providing a cylindrical recess therein that telescopically and displacably receives said outer casing upper end.

5. A ferrous chip removal tool comprising:

a cap member having an upper and a lower end, the upper end having means for attachment of a rod by which the tool is manipulated;

an outer non-magnetic tubular casing having an upper end attached to said cap member;

an inner non-magnetic tubular casing having a closed lower end and an upper end, the inner casing being telescopically received in said outer casing;

a magnet positioned within said inner casing and being fixedly supported to said cap member; and a coiled spring within said outer casing and surrounding said inner casing arranged to displacably downwardly bias said outer casing with respect to said cap member to a first position in which said outer casing lower end extends beyond said inner casing lower end, downward force on said cap member causing said outer casing to be displaced upwardly relative to said cap member and said inner casing to a second position in which said lower end of said inner casing having said magnet therein is in proximity with said outer casing lower end to permit said magnet to attract ferrous chips that am held against said inner casing lower end.

6. A ferrous chip removal tool according to claim 5 wherein said cap member lower end is tubular providing a cylindrical recess therein and wherein said outer tubular casing upper end is received in said cap member cylindrical recess.

7. A ferrous chip removal tool comprising:

a stem having an upper end adaptable to receive the attachment of a rod whereby the tool can be manipulated to pick up chips and having a lower end with a magnet attached thereto;

an inner tubular non-magnetic casing telescopically and displacably received on said stem, the inner casing having a closed lower end against which said magnet normally fits;

an outer tubular non-magnetic casing telescopically and displacably received on said inner casing, the outer casing having an upper end and an open lower end;

spring biased means urging said outer casing downwardly with respect to said inner casing whereby said inner casing lower end having said magnet therein is fully received within said outer casing open lower end, said outer casing being displaced upwardly when forced against an object to expose said inner casing lower end having said magnet therein whereby ferrous chips may be gathered; and spring biased means urging said inner casing upwardly with respect to said stem whereby said magnet is normally held against said inner casing closed end whereby ferrous chips may be attracted thereto and whereby ferrous chips are dislodged when said inner casing closed end is displaced away from said magnet.

8. A ferrous chip removal tool according to claim 7 including:

a cap member having an upper and a lower end, the upper end having means for attachment to said stem, the lower end being tubular providing a cylindrical recess therein that telescopically and displacably receives said outer casing upper end.

* * * * *